//
US007835640B2

United States Patent
Geris et al.

(10) Patent No.: US 7,835,640 B2
(45) Date of Patent: Nov. 16, 2010

(54) METHOD AND SYSTEM FOR OPERATING A CAMERA FLASH ON A MOBILE DEVICE

(75) Inventors: Ryan Geris, Kitchener (CA); Lyall Winger, Waterloo (CA); Christopher Book, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 264 days.

(21) Appl. No.: 12/117,910

(22) Filed: May 9, 2008

(65) Prior Publication Data

US 2009/0279881 A1    Nov. 12, 2009

(51) Int. Cl.
G03B 7/26    (2006.01)
(52) U.S. Cl. ..................................................... 396/205
(58) Field of Classification Search .......... 396/205–206
See application file for complete search history.

(56) References Cited

U.S. PATENT DOCUMENTS

| 4,297,639 | A | 10/1981 | Branham |
| 4,390,841 | A | 6/1983 | Martin et al. |
| 5,352,968 | A | 10/1994 | Reni et al. |
| 5,596,260 | A | 1/1997 | Moravec et al. |
| 5,600,230 | A | 2/1997 | Dunstan |
| 5,606,242 | A | 2/1997 | Hull et al. |
| 5,606,243 | A | 2/1997 | Sakai et al. |
| 5,796,239 | A | 8/1998 | van Phuoc et al. |
| 5,847,566 | A | 12/1998 | Marritt et al. |
| 5,903,856 | A | 5/1999 | Rompe |
| 5,912,544 | A | 6/1999 | Miyakawa et al. |
| 5,949,219 | A | 9/1999 | Weiss |
| 6,025,695 | A | 2/2000 | Friel et al. |
| 6,160,380 | A | 12/2000 | Tsuji et al. |
| 6,198,254 | B1 | 3/2001 | Satake et al. |

(Continued)

FOREIGN PATENT DOCUMENTS

JP    07-241039 A    9/1995

(Continued)

OTHER PUBLICATIONS

Extended European Search Report dated Dec. 9, 2008, European Application No. 08156032.8.

(Continued)

*Primary Examiner*—W. B. Perkey
*Assistant Examiner*—Dennis Hancock
(74) *Attorney, Agent, or Firm*—Bereskin & Parr LLP/S.E.N.C.R.L., s.r.l.

(57) ABSTRACT

Various embodiments are described herein for a method and related apparatus for safely operating a camera flash on a mobile device powered by a battery module. Upon determination that the camera flash needs to be activated the method comprises measuring several battery parameters including the voltage and temperature of the battery module. An equivalent series resistance (ESR) of the battery module is determined based on the battery temperature. The maximum flash current is then determined based on the battery voltage, and ESR along with potential current loads that may occur during operation of the camera flash, and a minimum battery voltage for safe operation of the mobile device where the battery voltage has been adjusted if needed. The device is then configured to draw a current from the battery module that is not greater than the maximum flash current.

20 Claims, 4 Drawing Sheets

U.S. PATENT DOCUMENTS

| | | | |
|---|---|---|---|
| 6,219,493 B1 * | 4/2001 | Aoki et al. | 396/206 |
| 6,233,016 B1 * | 5/2001 | Anderson et al. | 348/372 |
| 6,351,611 B1 * | 2/2002 | Nonaka | 396/203 |
| 6,748,273 B1 | 6/2004 | Obel et al. | |
| 7,418,356 B2 | 8/2008 | Jin et al. | |
| 7,633,234 B2 | 12/2009 | Drader et al. | |
| 2002/0047626 A1 | 4/2002 | Odaka et al. | |
| 2002/0057909 A1 * | 5/2002 | Honda et al. | 396/206 |
| 2002/0171372 A1 | 11/2002 | Motomura et al. | |
| 2004/0117137 A1 | 6/2004 | Jin et al. | |
| 2007/0024738 A1 * | 2/2007 | Kanai et al. | 348/335 |
| 2008/0037979 A1 | 2/2008 | Guthrie et al. | |

FOREIGN PATENT DOCUMENTS

| | | |
|---|---|---|
| JP | 2000 047307 | 2/2000 |
| JP | 2000047307 A | 2/2000 |
| JP | 2001-330654 A | 11/2001 |
| JP | 2002320336 | 10/2002 |
| JP | 2006 058482 | 3/2006 |
| JP | 2006058482 A * | 3/2006 |
| WO | 9924842 | 5/1999 |
| WO | WO 2004/029642 | 4/2004 |

OTHER PUBLICATIONS

Co-pending U.S. Appl. No. 11/620,755, "Method and Apparatus for Maximizing the Sustainable Flash . . . ", Filed Jan. 8, 2007. (File History Retrievable from PAIR).
Co-pending U.S. Appl. No. 10/668,763, "System and Method of Battery Capacity Estimation", Filed Aug. 26, 2008. (Retrievable from PAIR).
United States Office Action dated Dec. 22, 2004, U.S. Appl. No. 10/668,763.
Office Action Response dated Mar. 22, 2005, U.S. Appl. No. 10/668,763.
United States Final Office Action dated Apr. 6, 2005, U.S. Appl. No. 10/668,763.
Office Action Response dated Jul. 7, 2005, U.S. Appl. No. 10/668,763.
United States Advisory Action dated Jul. 14, 2005, U.S. Appl. No. 10/668,763.
Office Action Response dated Aug. 8, 2005, U.S. Appl. No. 10/668,763.
United States Office Action dated Aug. 17, 2005, U.S. Appl. No. 10/668,763.
Office Action Response dated Nov. 16, 2005, U.S. Appl. No. 10/668,763.
United States Office Action dated Dec. 19, 2005, U.S. Appl. No. 10/668,763.
Notice of Appeal dated Mar. 16, 2006, U.S. Appl. No. 10/668,763.
Pre-Brief Appeal Conference Decision dated Aug. 14, 2006, U.S. Appl. No. 10/668,763.
United States Office Action dated Aug. 21, 2006, U.S. Appl. No. 10/668,763.
Office Action Response dated Nov. 15, 2006, U.S. Appl. No. 10/668,763.
Interview Summary dated Nov. 16, 2006, U.S. Appl. No. 10/668,763.
Notice of Non-Compliant Amendment dated Dec. 7, 2006, U.S. Appl. No. 10/668,763.
Office Action Response dated Dec. 26, 2006, U.S. Appl. No. 10/668,763.
Notice of Allowance dated Feb. 6, 2007, U.S. Appl. No. 10/668,763.
Response dated Apr. 12, 2007, U.S. Appl. No. 10/668,763.
United States Office Action dated Apr. 25, 2007, U.S. Appl. No. 10/668,763.
Office Action Response dated Jul. 23, 2007, U.S. Appl. No. 10/668,763.
Interview Summary dated Aug. 21, 2007, U.S. Appl. No. 10/668,763.
United States Final Office Action dated Aug. 21, 2007, U.S. Appl. No. 10/668,763.
Office Action Response dated Jan. 22, 2008, U.S. Appl. No. 10/668,763.
Notice of Allowance dated Mar. 6, 2008, U.S. Appl. No. 10/668,763.
European Search Report dated Nov. 24, 2006, European Patent Application No. 03750215.0.
Co-pending U.S. Appl. No. 11/620,755, "Method and Apparatus for Maximizing the Sustainable Flash of a Handheld Portable Electronic Device", Filed Jan. 8, 2007. (Retrievable from PAIR).
Notice of Allowance dated Aug. 3, 2009, U.S. Appl. No. 11/620,755.
European Search Report dated Nov. 9, 2009, European Patent Application No. 08156032.8.

* cited by examiner

METHOD AND SYSTEM FOR OPERATING A CAMERA FLASH ON A MOBILE DEVICE

FIELD

The various embodiments described herein generally relate to a method and system for operating a camera flash on a mobile electronic device.

BACKGROUND

New applications are continually being added to mobile electronic devices. For example, various mobile devices now include a camera unit. These camera units use a flash, such as a Light Emitting Diode (LED) camera flash, which requires a large amount of camera flash current under certain situations. Since the mobile device is battery-powered, it is important to control the amount of current used by the camera flash because the camera flash current may result in "brown out" of the mobile device under certain conditions since there are other system loads that can occur when the camera flash is active. Brown out, also known as battery droop, means that the battery voltage drops to a level that can impair the operation of other device functions and possibly even cause the device to reset.

Most of the factors that affect brown out are not generally known to the user at the time of device operation, e.g., battery parameters, device load size and camera flash load size. Accordingly, conventional techniques assume a worst-case voltage drop when deciding whether to activate the camera flash while at the same time avoiding brown out. However, using a worst-case voltage drop limits the usefulness of the camera flash; i.e., the camera flash won't trigger sometimes even though the device could support a camera flash pulse without encountering brown out or reset.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
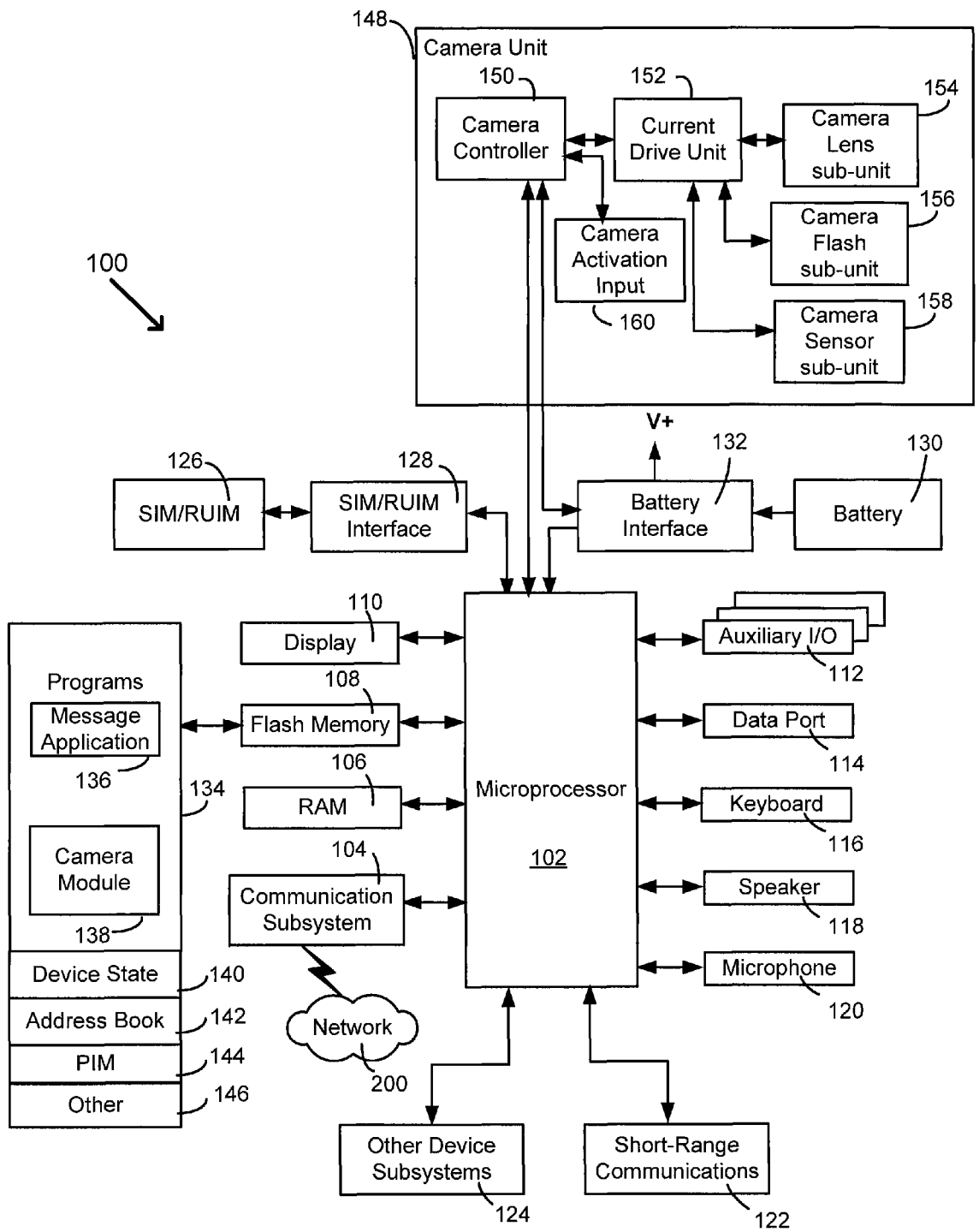
FIG. 1 is a block diagram of a mobile device having a camera unit with a flash in one example implementation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

Also, the description is not to be considered as limiting the scope of the embodiments described herein. The detailed description begins with a general description of a mobile device having a camera flash and then proceeds to describe example embodiments of a method and system for operating the camera flash.

To aid the reader in understanding the structure of the mobile device, reference will be made to FIGS. 1 to 3. However, it should be understood that the embodiment of the mobile device is not limited to that which is described herein. Examples of different mobile devices generally include any portable electronic device that includes a camera flash such as cellular phones, cellular smart-phones, wireless organizers, personal digital assistants, computers, laptops, handheld wireless communication devices, wireless enabled notebook computers, wireless Internet appliances and the like. These mobile devices are generally portable and thus are battery-powered. While some of these devices include wireless communication capability, others are standalone devices that do not communicate with other devices.

Referring to FIG. 1, shown therein is a block diagram of a mobile device 100 in one example implementation. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiment described herein is intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in one example implementation, other wireless networks can also be associated with the mobile device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries in a battery module 130. The battery interface 132 is coupled to a regulator (not shown), which assists the battery module 130 in providing power V+ to the mobile device 100. Alternatively, the battery module 130 can be a smart battery as is known in the art. Smart batteries generally include a battery processor, battery memory, switching and protection circuitry, measurement circuitry and a battery module that includes one or more batteries, which are generally rechargeable. In either case, the one or more batteries in the battery module 130 can be made from lithium, nickel-cadmium, lithium-ion, or other suitable composite material.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative implementation, all messages can be stored in a remote location while only recent messages can be stored on the mobile device 100.

The mobile device 100 further includes a camera module 138, a device state module 140, an address book 142, a Personal Information Manager (PIM) 144, and other modules 146. The camera module 138 is used to control the camera operation for the mobile device 100 including determining the maximum flash current that can be drawn from the battery module 130 without adversely affecting the operation of the mobile device 100 such as causing brown-out, reset, affecting the operation of any applications being performed by the mobile device 100 and the like. The operation of the camera module 138 is discussed in further detail below with regards to FIG. 4.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 also includes a camera unit 148 that allows a user of the mobile device 100 to take pictures. The camera unit 148 includes a camera controller 150, a current drive unit 152, a camera lens sub-unit 154, a camera flash sub-unit 156, a camera sensor sub-unit 158 and a camera activation input 160. The camera controller 150 configures the operation of the camera unit 148 in conjunction with information and instructions received from the microprocessor 102. It should be noted that the structure shown for the camera unit 148 and the description that follows is only one example of an implementation of a camera on a mobile device and that the technique of determining maximum flash current should not be limited to this particular example embodiment.

The camera controller 150 receives an activation signal from the camera activation input 160 when a user indicates that a picture is to be taken. In alternative embodiments, the microprocessor 102 receives the activation signal. Typically, the camera activation input 160 is a push-button which is depressed by the user when the user wants to take a picture. In alternative embodiments, the camera activation input 160 can be a switch or some other appropriate input mechanism as is known by those skilled in the art.

Upon actuation of the camera activation input 160, the mobile device 100 initiates camera mode. The camera module 138 is then executed to operate the camera unit 148 which includes determining the maximum camera flash current (i.e. the amplitude of the maximum camera flash current) that can be supported by the mobile device 100 without any adverse effects if a camera flash is needed. The determination of the maximum camera flash current that can be drawn from the battery module 130 is described in further detail below. The camera module 138 may also determine the magnitude of light that needs to be produced by the camera flash for the current physical surroundings of the mobile device 100 so that a good quality picture is taken; in this regard various techniques known to those skilled in the art can be employed. Current pulses of varying lengths may be used to generate the camera flash. Alternatively, a constant pulse length can be used along with a maximum amplitude setting and other elements can be varied, such as the aperture of the lens, to have the intended effect of a camera flash having a different light output.

The camera controller 150 then instructs the current drive unit 152 to generate the camera flash current that is required by the camera flash sub-unit 156 without drawing more than the maximum camera flash current that is allowable from the battery module 130. In other words, the amplitude of the camera flash current generated by the current drive unit 152 is such that the amplitude of the current that is drawn from the battery module 130 to support the generation of the camera flash current does not exceed the amplitude of the maximum camera flash current. The camera controller 150 also configures the current drive unit 152 to generate the current that is required to actuate the camera lens sub-unit 154. The current drive unit 152 is a linear regulator in which the input current to the linear regulator and the output current of the linear regulator are equal. Alternatively, the current drive unit 152 can be a combination of a boost and a linear regulator, in order to provide an increased amount of current to the camera flash sub-unit 158 compared to the current obtained from the battery module 130 when needed. Alternatively, the current drive unit 152 can be a combination of a buck and a linear regulator that can be used if the camera flash voltage is always less than the battery module voltage. Alternatively, both a buck and a boost circuit can be used with a linear regulator for the current drive unit 152.

Depending on the particular configuration that is employed, the camera lens sub-unit 154 includes a lens along with a shutter and/or aperture along with components to open and close the shutter and/or aperture. Rather than these components, the camera lens sub-unit 154 can include components that provide telescopic functionality to allow the user to take a "zoomed-in" or "zoomed-out" picture. In other alternatives, the camera lens sub-unit 154 can include all of these components. The structure required for each of these alternatives are known to those skilled in the art.

The camera flash sub-unit 156 includes a camera flash to generate light having an appropriate magnitude or lumen to increase the quality of the images that are obtained by the camera unit 148. However, the output of the camera flash sub-unit 156 is limited due to the limit on the current that can be drawn from the battery module 130 for flash purposes (the limit is specified by the maximum camera flash current). The camera flash sub-unit 156 is typically based on LED flash technology. In alternative embodiments, other types of appropriate flashes can be used.

The camera sensor sub-unit 158 captures image data and sends the image data to the camera controller 150. The camera sensor sub-unit 158 also requires current for operation and receives this current from the current drive unit 152. The camera sensor sub-unit 158 can be based on CMOS sensor technology, CCD sensor technology and the like as is commonly known by those skilled in the art.

Figure 2:
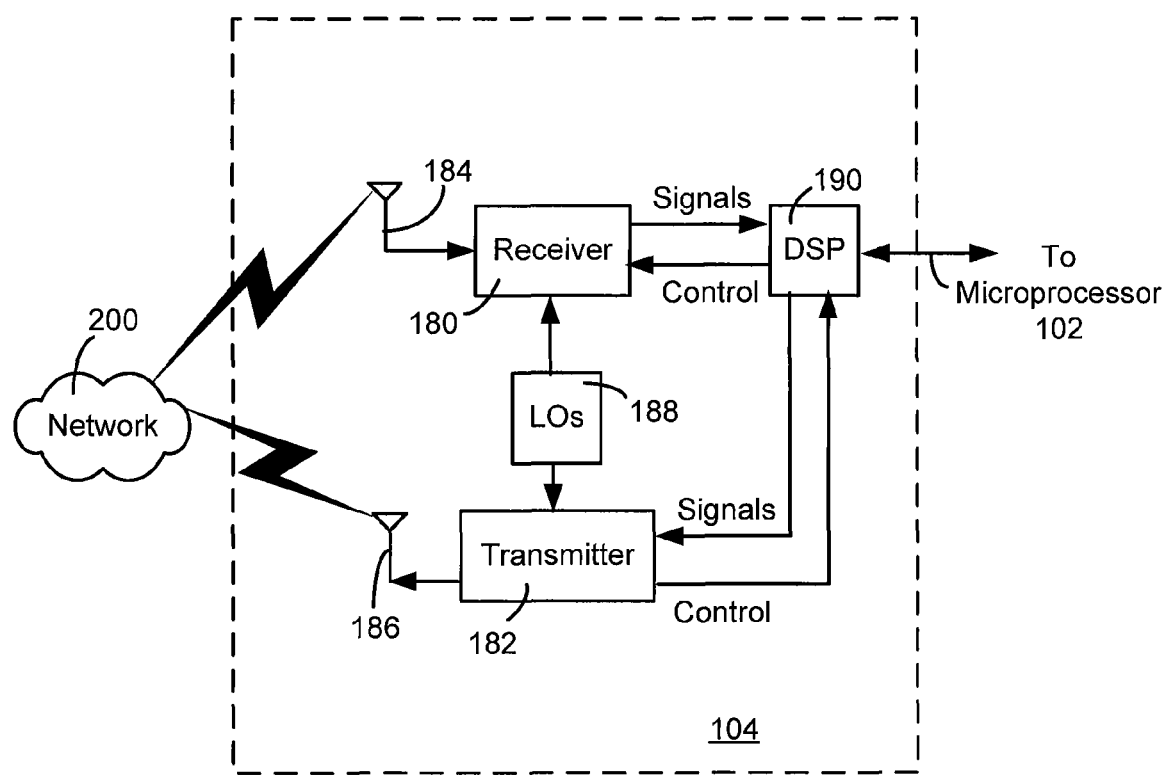
FIG. 2 is a block diagram of an example embodiment of a communication subsystem component of the mobile device of FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184, 186, Local Oscillators (LOs) 188, and a processing module such as a Digital Signal Processor (DSP) 190.

The particular design of the communication subsystem 104 is dependent upon the network 200 in which mobile device 100 is intended to operate, thus it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when it is sending to the network 200 and is otherwise turned off to conserve resources. Similarly, the receiver 180 is periodically turned off to conserve power until it is needed to receive signals or information (if at all) during designated time periods.

Figure 3:
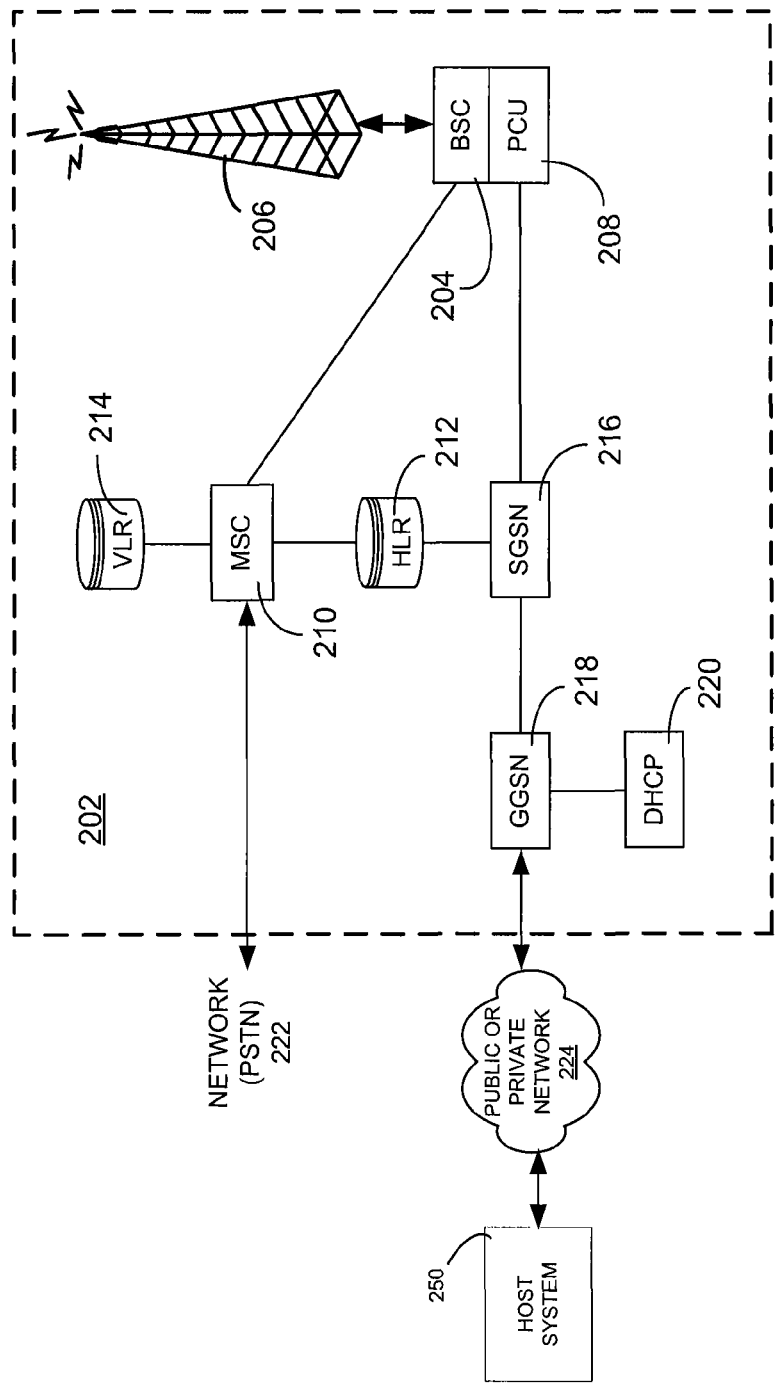
FIG. 3 is a block diagram of a node of a wireless network in one example implementation.

Referring now to FIG. 3, a block diagram of a node of a wireless network is shown as 202. In practice, the network 200 comprises one or more nodes 202. The mobile device 100 communicates with a node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be deallocated and the IP address returned to the IP address pool managed by the DHCP server 220.

Figure 4:
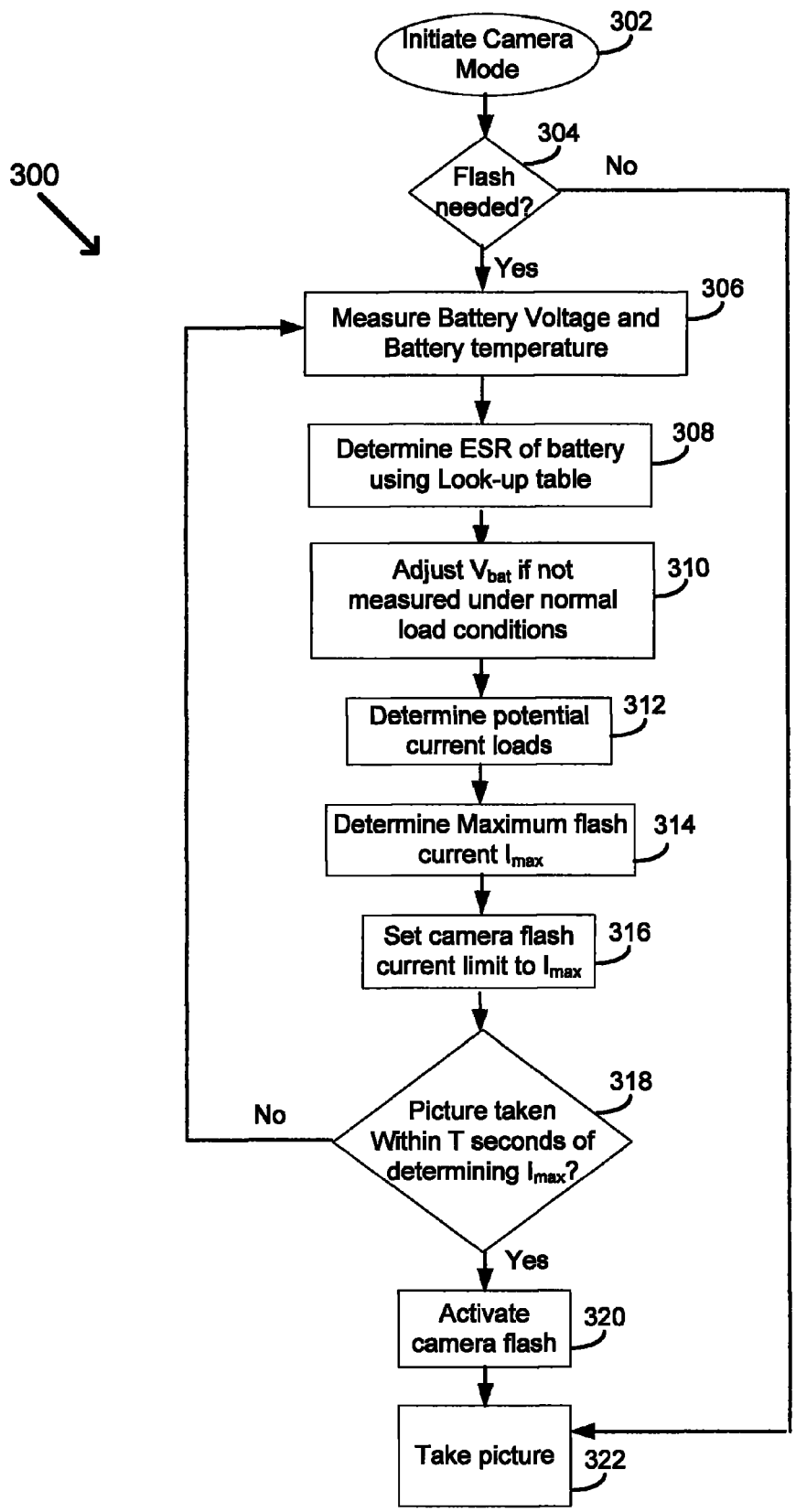
FIG. 4 is a flow chart diagram of an example embodiment of a method of operating a camera flash.

Referring now to FIG. 4, shown therein is a method 300 for operating a camera flash. At step 302, a user of the device actuates the camera activation input 160 and the mobile device 100 initiates camera mode. Before taking a picture, it is determined whether the camera unit 148 needs to generate a camera flash at step 304. Techniques for making this determination are known by those skilled in the art. If a camera flash is not needed, then the method 300 proceeds to step 322 at which point a picture is taken. However, if the method 300 determines that a camera flash is needed then the method proceeds to determine the maximum flash current ($I_{max}$) that can be drawn from the battery module 130 without otherwise adversely affecting device operation (i.e. without incurring brown out, device reset or other problems with device operation.).

The method 300 determines $I_{max}$ based on several measurements that do not require a pre-flash operation. Generally, the battery Equivalent Series Resistance (ESR) is obtained based on measuring battery temperature. Battery voltage is also measured taking into account whether any high current loads occurred during the reading. This information is then used to determine $I_{max}$. Accordingly, the method 300 involves determining $I_{max}$ without a pre-flash operation and the method 300 requires fewer measurements/operations compared to conventional techniques. The method 300 can be used in any device that uses a camera flash. It should be noted that the term battery is used herein interchangeably with the term battery module 130 and should be understood to mean one or more batteries connected in series or parallel.

At step 306 battery parameters of the battery module 130 are measured. Examples of battery parameters that are measured include the battery voltage ($V_{meas}$) and the battery temperature ($T_{bat}$). This information is measured via the battery interface 132, which includes an analog-to-digital circuit as is known by those skilled in the art. Data is read from the positive and negative supply pins of the battery module 132 as well as a temperature pin (all not shown). At this point additional drains on battery current ($I_{drain}$) due to additional loads that are active during the voltage measurement may be determined by measuring the current drain. Alternatively, $I_{drain}$ can be determined at step 310 as described below.

At step 308, the ESR of the battery module 130 is determined based on the measured battery temperature. This can be done using a lookup table that correlates battery temperature with battery ESR after a current pulse of a given duration (i.e. ESR for 500 ms ($ESR_{500}$) is the ESR of the battery after a 500 ms current pulse is generated for the camera flash current). An example of a lookup table is given in Table 1. The measured battery temperature is used as an index into the table and the corresponding battery $ESR_{500}$ value is read. If the measured battery temperature falls in between two battery temperatures in the lookup table, then an appropriate interpolation method can be used to obtain the battery $ESR_{500}$ value. Data can be stored to obtain the ESR for other pulse lengths depending on the hardware employed by the camera unit 148. Alternatively, several lookup tables can be stored for several camera flash current pulse lengths depending on how the camera unit actually operates. Different lookup tables can also be stored for different types of batteries or different battery manufacturers. The lookup table(s) can be stored in the flash memory 108 of the mobile device 100. Alternatively, if a smart battery is used, the lookup table(s) can be stored in the battery memory of the smart battery. To account for the age of the battery, the values in the lookup table(s) can be determined based on aged batteries.

TABLE 1

Lookup Table For Battery $ESR_{500}$ versus Battery Temperature

| Battery Temperature (degrees C.) | Battery $ESR_{500}$ (Ohm) |
| --- | --- |
| −18 | 1.100 |
| −9 | 0.612 |
| 1 | 0.518 |
| 10 | 0.341 |
| 23 | 0.242 |
| 31 | 0.172 |
| 41 | 0.159 |
| 51 | 0.157 |
| 60 | 0.152 |

It may also be possible in certain cases to use a formula rather than a lookup table that relates battery temperature to battery ESR. The formula can be developed based on testing and curve fitting. However, there may be situations in which the formula does not provide ESR values that are as accurate as those provided by a lookup table.

At step 310, the method determines whether to adjust the voltage measurement if it was not made under normal load conditions so that the voltage measurement represents a value measured as if the mobile device 100 was under normal load. Normal load means that the mobile device 100 is running idle, so the microprocessor 102 is operational but there are currently no extra loads to support or extra tasks to perform. An example of such an active load is a radio that is transmitting or receiving during the measurement step 306. An example of a radio is the communication system 104 shown in FIGS. 1 and 2. However, it should be understood that additional radios can be included in the mobile device 100. For instance, there can be both WLAN and WPAN radios as well as other types of radios. Accordingly, the mobile device 100 can have additional communication subsystems or in alternative embodiments the communication subsystem 104 can include more than one radio. Examples of various radios are given below in relation to step 312. Also it should be understood that there can be other loads which have to be monitored and accounted for in terms of current drain.

If it is determined at step 310 that there is an active load that is draining additional current from the battery module 130 during voltage measurement then the measured voltage is corrected or adjusted according to:

$$V_{bat} = V_{meas} + I_{drain} * ESR(\text{loaded}) \tag{1a}$$

where $V_{bat}$ is the adjusted battery voltage measurement, $V_{meas}$ is the measured battery voltage, $I_{drain}$ is the additional current drain on the battery module 130 due to the loads that are active during the voltage measurement and ESR is the determined ESR of the battery from step 308. For example, if both UMTS and WLAN radios are transmitting then $I_{drain} = I_{UMTS} + I_{WLAN}$ where $I_{UMTS}$ is the current drain due to UTMS radio operation and $I_{WLAN}$ is the current drain due to WLAN operation. These current drain values are determined during design of the mobile device 100. However, if there are no additional current drains on the battery module 130 during battery voltage measurement, then the battery voltage is the measured battery voltage as given by equation 1b.

$$V_{bat} = V_{meas}(\text{unloaded}) \tag{1b}$$

At step 312, the method 300 determines the potential current loads (i.e. high current loads ($I_{HiLoads}$)) that can potentially occur during the activation of the camera flash sub-unit 156 which will result in a further current drain from the battery module 130 in addition to the camera flash current. For example, if a WLAN radio may be on but a GSM radio may be off then the worst current value for a WLAN transmit or receive operation is used in this calculation. As another example, if both UMTS and WLAN radios may be on then the larger current value for a UMTS transmit or receive operation and the larger current value for a WLAN transmit or receive operation are added to determine $I_{HiLoads}$. These values are determined during the design of the mobile device 100.

For example, for devices that employ radios, at step 312 it is determined whether a radio occurrence, such as but not limited to a WI-FI (i.e. WLAN), GSM, CDMA or WPAN (such as Bluetooth) radio reception or radio transmission, may occur during camera flash operation since these operations generally represent high current loads that, when combined with the battery ESR, will affect the level at which the mobile device 100 encounters browns out or resets completely. It should be noted that other communication standards may be employed by the mobile device 100 that will place a load on the mobile device 100 and the examples given herein are not meant to be limiting. For example, the mobile device 100 can alternatively, or in addition, employ the UMTS (Universal Mobile Telecommunications System) standard and the like. The different communication standards will generally have a different effect on the level at which the system browns out or resets. These occurrences can be determined by monitoring activity on certain pins of the hardware used to implement these radios.

Step 312 can be done once in which case it is assumed that the radio occurrences may always occur during camera flash operation or it may be done just when the $I_{max}$ is determined since the time of the determination may have an affect on whether or not some of the high current loads will actually occur. It should also be noted that there can be other potential current loads that need to be taken into account and the operation of the radios described herein provides just one example.

At step 314, the amplitude for $I_{max}$ is determined according to the following equation:

$$I_{max} = \text{ABS}\left(\frac{V_{bat} - V_{min}}{ESR_{500}}\right) - \sum I_{HiLoads} \tag{2}$$

where: $ESR_{500}$ is the ESR of the battery determined by the look-up table and the battery temperature for a 500 ms camera flash pulse, $V_{min}$ is the minimum battery voltage at which the mobile device 100 can safely operate, $V_{bat}$ is the battery voltage measurement under normal load (which may or may not be adjusted as previously described) and $\Sigma I_{HiLoads}$ is the sum of the potential current loads that can occur during the operation of the camera flash sub-unit 156 that may result in additional current drain. The maximum camera flash current $I_{max}$ that can be drawn from the battery module 130 is determined so that the resulting potentially maximum voltage drop does not cause the mobile device 100 to brown out, reset or latch or otherwise suffer any adverse effects.

In alternative embodiments, a guardband can be added to the values used in equation 2 so that $I_{max}$ is reduced to further ensure that the mobile device 100 will not brown out or reset during a camera flash operation. A guardband is basically a safety factor that is applied to various parameters. For instance, if $V_{min}$ is 3 V, then applying a guardband of 10% results in using a value of 3.3 V in equation 2. As another example, if the current load due to a UMTS transmission or reception is 500 mA then a guardband of 10% results in using a value of 550 mA in equation 2.

It should be noted that ESR values for other camera flash pulse durations can be used in equation 2 and the method 300 is not limited to using values for $ESR_{500}$ so the variable $ESR_X$ may be generically used in equation 2 for a pulse length of X ms.

At step 318 it is determined whether the camera picture is actually taken within a certain predetermined time period T of determining $I_{max}$. If not and if a camera picture is still being taken and a camera flash is still needed, then the method 300 goes to step 306 to re-determine $I_{max}$. This is because the battery voltage can change due to other current drains of the mobile device 100 that can occur during the camera mode. However, the battery temperature varies more slowly over time.

Otherwise, if the camera flash is activated within T seconds of determining Imax, the method 300 proceeds to step 320 at which point the camera flash sub-unit 156 is activated and the camera flash current is generated by the current drive unit 152 such that the current drawn from the battery module 130 does not exceed $I_{max}$. The time period T depends on the operations performed by the mobile device 100. For example, the time period T can be 5 seconds in some embodiments. Depending on the current drive unit 152 that is used for driving the camera flash sub-unit 156, the camera flash current may match $I_{max}$ or it may be need to be converted by using either a boost or a buck flash driver or a combination of both a boost and a buck flash driver as described previously in relation to FIG. 1. A picture is then taken at step 322.

In one aspect, according to at least one exemplary embodiment described herein, there is provided a method of operating a camera flash on a mobile device powered by a battery module, wherein upon determination that the camera flash needs to be activated the method comprises: measuring battery parameters of the battery module without operating the camera flash; determining an equivalent series resistance (ESR) of the battery module based on one of the measured battery parameters; determining a maximum flash current based on the measured battery parameters, the battery ESR, potential current loads that may occur during the operation of the camera flash and a minimum battery voltage for operation of the mobile device; and generating a camera flash current while drawing a current from the battery module with an amplitude less than or equal to the maximum flash current.

The measured battery parameters comprise a battery voltage and a battery temperature of the battery module.

A look-up table of battery temperature values and associated ESR values of the battery module can be used to determine the ESR of the battery module from the measured battery temperature.

Additional look-up tables can be used for different pulse lengths in the camera flash current.

The determination of the maximum flash current can be repeated if the camera flash is not operated within a predetermined time period after determining the maximum flash current.

The measured battery voltage is adjusted if an additional current drain occurred during measurement of the battery voltage.

If the mobile device comprises at least one radio, the potential current loads may comprise current loads due to radio transmission or radio reception.

The potential current loads can be determined before each determination of the maximum flash current.

The maximum flash current ($I_{max}$) is determined according to:

$$I_{max} = ABS\left(\frac{V_{bat} - V_{min}}{ESR}\right) - \sum I_{HiLoads}$$

where: $V_{min}$ is the minimum battery voltage at which the mobile device can operate, $\Sigma I_{HiLoads}$ is a sum of the potential current loads that can occur during the operation of the camera flash and $V_{bat}$ is the measured battery voltage which has been adjusted if there is an additional current drain during measurement of the battery voltage.

In another aspect, according to at least one exemplary embodiment described herein, there is provided a mobile device comprising a microprocessor configured to control the operation of the mobile device; a battery module configured to provide power to the mobile device; and a camera unit configured to allow a user of the mobile device to take pictures, the camera unit comprising a camera flash sub-unit having a camera flash and a current drive unit configured to provide a camera flash current to the camera flash sub-unit for activation of the camera flash. Upon determination that the camera flash needs to be activated the microprocessor is adapted to determine a maximum flash current based on measured battery parameters obtained without operating the camera flash, a battery ESR determined from one of the measured battery parameters, potential current loads that may occur during the operation of the camera flash and a minimum battery voltage for operation of the mobile device, and wherein the current drive unit is adapted to generate the camera flash current while drawing a current from the battery module with an amplitude less than or equal to the maximum flash current.

It should be understood that various modifications can be made to the embodiments described and illustrated herein, without departing from the embodiments, the general scope of which is defined in the appended claims. For example, the technique described herein can be applied to other camera flash technologies other than just LED technologies such as Organic Light-Emitting Diode (OLED) technologies and the like.

The invention claimed is:

1. A method of operating a camera flash on a mobile device powered by a battery module, wherein upon determination that the camera flash needs to be activated the method comprises:
    measuring battery parameters of the battery module without operating the camera flash;
    determining an equivalent series resistance (ESR) of the battery module based on one of the measured battery parameters;
    determining a maximum flash current based on the measured battery parameters, the ESR of the battery module, potential current loads that may occur during the operation of the camera flash and a minimum battery voltage for operation of the mobile device; and
    generating a camera flash current while drawing a current from the battery module with an amplitude less than or equal to the maximum flash current;
    wherein the measured battery parameters comprise a battery voltage and a battery temperature of the battery module;
    wherein the method comprises using a look-up table of battery temperature values and associated ESR values of the battery module to determine the ESR of the battery module from the measured battery temperature; and
    wherein the method further comprises using additional look-up tables for different pulse lengths in the camera flash current.

2. The method of claim 1, wherein the method is repeated if the camera flash is not operated within a predetermined time period after determining the maximum flash current.

3. The method of claim 1, wherein the measured battery voltage is adjusted if an additional current drain occurred during measurement of the battery voltage.

4. The method of claim 3, wherein the maximum flash current ($I_{max}$) is determined according to:

$$I_{max} = ABS\left(\frac{V_{bat} - V_{min}}{ESR}\right) - \sum I_{HiLoads}$$

where: $V_{min}$ is the minimum battery voltage at which the mobile device can operate, $\Sigma I_{HiLoads}$ is a sum of the potential current loads that can occur during the operation of the camera flash and $V_{bat}$ is the measured battery voltage which has been adjusted if there is an additional current drain during measurement of the battery voltage.

5. The method of claim 3, wherein the measured battery voltage is adjusted according to: $V_{bat}=V_{meas}+I_{drain}ESR$, where: $V_{bat}$ is the adjusted battery voltage measurement, $V_{meas}$ is the measured battery voltage, and $I_{drain}$ is the additional current drain that occurred during measurement of the battery voltage.

6. The method of claim 1, wherein the mobile device comprises at least one radio and the potential current loads comprise current loads due to radio transmission or radio reception.

7. The method of claim 1, wherein the potential current loads are determined before each determination of the maximum flash current.

8. The method of claim 1, wherein values in at least one of the look-up table and additional look-up tables are determined for aged batteries.

9. The method of claim 1, wherein different lookup tables are used for different types of batteries or different battery manufacturers.

10. The method of claim 1, further comprising interpolating the ESR of the battery module, if the measured battery temperature falls between two battery temperatures in the look-up table.

11. A mobile device comprising:
a microprocessor configured to control the operation of the mobile device;
a battery module configured to provide power to the mobile device; and
a camera unit configured to take pictures, the camera unit comprising a camera flash sub-unit having a camera flash and a current drive unit configured to provide a camera flash current to the camera flash sub-unit for activation of the camera flash;
wherein, upon determination that the camera flash needs to be activated the microprocessor is adapted to determine a maximum flash current based on measured battery parameters obtained without operating the camera flash, an equivalent series resistance (ESR) of the battery module determined from one of the measured battery parameters, potential current loads that may occur during the operation of the camera flash and a minimum battery voltage for operation of the mobile device;
wherein the measured battery parameters comprise a battery voltage and a battery temperature of the battery module;
wherein a look-up table of battery temperature values and associated ESR values of the battery module is used to determine the ESR of the battery module from the measured battery temperature;
wherein additional look-up tables are used for different pulse lengths in the camera flash current; and
wherein the current drive unit is adapted to generate the camera flash current while drawing a current from the battery module with an amplitude less than or equal to the maximum flash current.

12. The mobile device of claim 11, wherein the determination of the maximum flash current is repeated if the camera flash is not operated within a predetermined time period after determining the maximum flash current.

13. The mobile device of claim 11, wherein the measured battery voltage is adjusted if an additional current drain occurred during measurement of the battery voltage.

14. The mobile device of claim 13, wherein the maximum flash current ($I_{max}$) is determined according to:

$$I_{max} = ABS\left(\frac{V_{bat} - V_{min}}{ESR}\right) - \sum I_{HiLoads}$$

where:
$V_{min}$ is the minimum battery voltage at which the mobile device can operate $\Sigma I_{HiLoads}$ is a sum of the potential current loads that can occur during the operation of the camera flash and $V_{bat}$ is the measured battery voltage which has been adjusted if there is an additional current drain during measurement of the battery voltage.

15. The mobile device of claim 13, wherein the measured battery voltage is adjusted according to: $V_{bat}=V_{meas}+I_{drain}ESR$, where: $V_{bat}$ is the adjusted battery voltage measurement, $V_{meas}$ is the measured battery voltage, and $I_{drain}$ is the additional current drain that occurred during measurement of the battery voltage.

16. The mobile device of claim 11, wherein the mobile device further comprises at least one radio and the potential current loads comprise current loads due to radio transmission or radio reception.

17. The mobile device of claim 11, wherein the potential current loads are determined before each determination of the maximum flash current.

18. The mobile device of claim 11, wherein values in at least one of the look-up table and additional look-up tables are determined for aged batteries.

19. The mobile device of claim 11, wherein different look-up tables are used for different types of batteries or different battery manufacturers.

20. The mobile device of claim 11, wherein the ESR of the battery module is interpolated, if the measured battery temperature falls between two battery temperatures in the look-up table.

* * * * *